US008776150B2

(12) United States Patent
Tian

(10) Patent No.: US 8,776,150 B2
(45) Date of Patent: Jul. 8, 2014

(54) IMPLEMENTATION METHOD AND SYSTEM FOR A MEDIA-ON-DEMAND FRAME-SPANNING PLAYING MODE IN A PEER-TO-PEER NETWORK

(75) Inventor: Hongliang Tian, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 618 days.

(21) Appl. No.: 12/663,511

(22) PCT Filed: Dec. 24, 2007

(86) PCT No.: PCT/CN2007/003744
§ 371 (c)(1),
(2), (4) Date: Dec. 7, 2009

(87) PCT Pub. No.: WO2008/148268
PCT Pub. Date: Dec. 11, 2008

(65) Prior Publication Data
US 2010/0223648 A1 Sep. 2, 2010

(30) Foreign Application Priority Data
Jun. 7, 2007 (CN) .......................... 2007 1 0108414

(51) Int. Cl.
*H04N 7/173* (2011.01)
*H04N 5/783* (2006.01)
(52) U.S. Cl.
USPC ................. 725/88; 725/89; 725/90; 725/102; 386/343; 386/345; 386/346; 386/347; 386/352
(58) Field of Classification Search
CPC ............ H04N 21/2323; H04N 21/236; H04N 21/23608; H04N 21/632
USPC ............... 725/88–90, 102; 386/343, 345–352
See application file for complete search history.

(56) References Cited

U.S. PATENT DOCUMENTS

| 5,751,280 | A | * | 5/1998 | Abbott et al. | ................. | 715/203 |
| 5,818,439 | A | * | 10/1998 | Nagasaka et al. | ............... | 725/87 |
| 5,864,682 | A | * | 1/1999 | Porter et al. | ................. | 709/247 |
| 6,006,241 | A | * | 12/1999 | Purnaveja et al. | ............. | 715/205 |
| 6,014,706 | A | * | 1/2000 | Cannon et al. | ................ | 709/231 |
| 6,041,345 | A | * | 3/2000 | Levi et al. | ..................... | 709/217 |
| 6,064,794 | A | * | 5/2000 | McLaren et al. | .............. | 386/343 |
| 6,363,212 | B1 | * | 3/2002 | Fujinami et al. | .............. | 386/338 |

(Continued)

*Primary Examiner* — An Son P Huynh
(74) *Attorney, Agent, or Firm* — John A. Artz; Dickinson Wright PLLC

(57) ABSTRACT

The present invention discloses a method for implementing a cross frame playing mode in media-on-demand in a peer to peer network, comprising the following steps of: (a) partitioning a requested media file into blocks and encapsulating the blocks into a media content file, and recording a number of a block where each media key frame is located so that a frame index file is formed; (b) distributing said media content file and said frame index file in the peer to peer network; (c) when requesting a media, a client acquiring said frame index file and media blocks in said media content file from a source node; (d) when cross frame playing is required, the client calculating the number of a block where a next key frame is located according to said frame index file, and acquiring a corresponding media block to de-encapsulate, decode and play. The present invention also provides a system for implementing a cross frame displaying mode in media-on-demand in a peer to peer network, comprising a source node device and a target node device. The method conveniently satisfies the demand for VCR operations of a media being watched by the user in a P2P network,

11 Claims, 3 Drawing Sheets

(56) References Cited

U.S. PATENT DOCUMENTS

| | | | |
|---|---|---|---|
| 6,567,980 B1* | 5/2003 | Jain et al. | 725/61 |
| 6,697,568 B1* | 2/2004 | Kaku | 386/228 |
| 6,738,980 B2* | 5/2004 | Lin et al. | 725/88 |
| 6,871,006 B1* | 3/2005 | Oguz et al. | 386/346 |
| 6,937,599 B1* | 8/2005 | Yoshida et al. | 370/390 |
| 7,313,808 B1* | 12/2007 | Gupta et al. | 725/89 |
| 7,890,985 B2* | 2/2011 | Bowra et al. | 725/88 |
| 8,155,498 B2* | 4/2012 | Dow et al. | 386/221 |
| 8,392,834 B2* | 3/2013 | Obrador | 715/723 |
| 8,472,792 B2* | 6/2013 | Butt et al. | 386/345 |
| 2002/0048450 A1* | 4/2002 | Zetts | 386/95 |
| 2002/0062313 A1* | 5/2002 | Lee et al. | 707/3 |
| 2003/0123849 A1* | 7/2003 | Nallur et al. | 386/68 |
| 2006/0117357 A1* | 6/2006 | Surline | 725/90 |
| 2007/0033533 A1* | 2/2007 | Sull | 715/752 |
| 2008/0175559 A1* | 7/2008 | Jung et al. | 386/68 |
| 2009/0282444 A1* | 11/2009 | Laksono et al. | 725/89 |

* cited by examiner

IMPLEMENTATION METHOD AND SYSTEM FOR A MEDIA-ON-DEMAND FRAME-SPANNING PLAYING MODE IN A PEER-TO-PEER NETWORK

TECHNICAL FIELD

The present invention relates to a method and system for media-on-demand in the technical field of Peer To Peer Network (referred to as P2P for short hereinafter) and the field of broadband streaming media, and in particular, to a method and system for implementing a cross frame playing mode in P2P media-on-demand.

BACKGROUND OF THE INVENTION

With rapid development of the Internet and broadband access networks, utilizing the P2P technique, video-on-demand services can be successfully carried out in the Internet. A P2P streaming media network system is depicted in FIG. 1, the system consists of a master node and a number of child nodes. Wherein, all the network nodes have equal positions and any two nodes can be a server and client, and vise versa. To guarantee that the system operates effectively, the P2P streaming media master node is set as an information management server of the other child nodes to manage user information and program resource information of the system, i.e., to store media files, search (locate) media resource, maintain system node resource information, and is able to exchange resource information with other master nodes (not shown in the drawing). In the system, when child node 3 as a target node requests a program, the master node and other two child nodes 1 and 2 can all provide the service of this program and as source nodes, they all respond to the playing request from node 3 and partition the program files into data packets to send to node 3. Node 3 filters, sorts the received program data packets, combines them into a program stream, and then plays it in real time by block. However, the current P2P media-on-demand system generally does not support the user in implementing a cross frame playing mode, such as fast forward, fast backward, dragging, and so on, like that of a VCR, as well as a pause operation, thus cannot well satisfy the demand of the user for operating various playing modes of the video being watched.

SUMMARY OF THE INVENTION

The technical problem to be solved by the present invention is to provide a method for implementing a cross frame playing mode in P2P media-on-demand to support a function for client users to conveniently implementing operations of various playing modes (fast forward, fast backward, pause and dragging) when watching media programs.

In order to solve the above technical problem, the present invention provides a method for implementing a cross frame playing mode in media-on-demand in a peer to peer network, comprising the following steps of:

(a) partitioning a requested media file into blocks and encapsulating the blocks into a media content file, and recording a number of a block where each media key frame is located so that a frame index file is formed;

(b) distributing said media content file and said frame index file in the peer to peer network;

(c) when requesting a media, a client acquiring said frame index file and media blocks in said media content file from a source node;

(d) when cross frame playing is required, the client calculating the number of a block where a next key frame is located according to said frame index file, and acquiring a corresponding media block to de-encapsulate, decode and play.

As for the method of the present invention, wherein, said frame index file further comprises a frame number of each media key frame.

As for the method of the present invention, wherein, if said cross frame playing is playing fast forward or fast backward, and if a media key frame interval is fixed and the number of a current frame is i, step (d) further comprises:

(d1) calculating a fast forward or fast backward step P=a fast forward multiple (or fast backward multiple)/(the frame interval×a fixed quantity of frames played per second);

(d2) calculating the number of a next frame, that is, in fast forward, calculating the number of a subsequent $k^{th}$ media key frame to be played as (i+[kP]); Or, in fast backward, calculating the number of a subsequent $k^{th}$ media key frame to be played as (i−[kP]), wherein [ ] represents rounding operation;

(d3) according to the number of said next media key frame, looking up said frame index file to acquire the number of the block where the key frame number is located, and from the block with the number, extracting the frame with the number of said next key frame to decode and play.

As for the method of the present invention, wherein, said frame index file further comprises a time stamp of each media key frame;

if said cross frame playing is playing fast forward or fast backward, and if a media key frame interval is unfixed and the number of a current frame is i, step (d) comprises:

(d1) calculating an ideal time stamp of a next key frame to be played subsequently according to said i; that is, in fast forward, the ideal time stamp of a subsequent $k^{th}$ key frame to be played being T(i+k)=t(i)+k×a fast forward multiple/a fixed quantity of frames played per second; and in fast backward, the ideal time stamp of a subsequent $k^{th}$ key frame to be played being T(i−k)=t(i)−k×a fast backward multiple/the fixed quantity of frames played per second;

(d2) looking up the frame index file to find the number of a key frame of which the time stamp is closest to said ideal time stamp to take as the number of the next key frame to be played subsequently; that is, in fast forward, finding the number of a key frame of which the time stamp is closest to T(i+k); or in fast backward, finding the number of a key frame of which the time stamp is closest to T(i−k);

(d3) according to the number of said next key frame, looking up said frame index file to acquire the number of the block where the key frame number is located, and from the block with the number, extracting the frame with the number of said next key frame to decode and play.

As for the method of the present invention, wherein, said frame index file further comprises a time stamp of each media key frame;

if said cross frame playing is dragging and playing, in step (d), the method further comprising: based on comparison between a time corresponding to a dragging point and time stamps of index entries in said frame index file, acquiring a block number corresponding to a frame of which the time stamp is closest to said corresponding time, and staring from the block number, sequentially acquiring media data to decode and play.

As for the method of the present invention, wherein, said media content file comprises one or more media blocks, and each media block consists of a block head and a block body; and a partitioning and encapsulation format of said media content file is:

said block body consisting of media frames arranged in a sequence of time stamps and an unfilled part being filled with a filler field;

said block head describing content of media block data in the block, and said block head comprising the following fields: a media content identification Cid, a block number Bno, a time stamp Time, a quantity of frames in the block Fcnt, and an optional frame description item Fitem.

As for the method of the present invention, wherein, said media content file is a video file and said media key frame is an I frame.

The present invention further comprises a system for implementing a cross frame displaying mode in media-on-demand in a peer to peer network, comprising a source node device and a target node device, wherein, said source node device is used to partition a requested media file into blocks and encapsulate the blocks into a media content file, record a number of a block where each media key frame is located so that a frame index file is formed, and then distribute said media content file and said frame index file in the peer to peer network;

said target node device is used to acquire said frame index file and media blocks in said media content file from said source node device when requesting a media; and when cross frame playing is required, used to calculate the number of a block where a next key frame is located according to said frame index file, and acquire a corresponding media block to de-capsulate, decode and play.

As for the system of the present invention, wherein said source node device comprises a source node storage unit and a source node communication unit; said target node device comprises a target node storage unit, a target node communication unit, a block processing unit and a decoding and playing unit, wherein, said streaming media file stored in said source node storage unit comprises a media block file and a frame index file;

said source node communication unit is used to send a streaming media file stored in said source node storage unit to said target node when receiving a command of requesting a media sent by said target node;

said target node communication unit stores said streaming media file received in said target node storage unit;

said block processing unit is used to extract said frame index file from said target node storage unit when a user needs to perform a cross frame operation of the media content, acquire the number of a media block where a next media frame is located from the frame index file, de-capsulate the media blocks starting from the media block number in said target node storage unit and send to said decoding and playing unit;

said decoding and playing unit decodes and plays the de-capsulated data.

As for the system of the present invention, wherein, said frame index file in said source node storage unit further records a number of each media key frame;

said block processing unit acquires the number of the media block where the next media frame is located in the following manner: when the user selects a playing mode of fast forward or fast backward, and if a media key frame interval is fixed and the number of a current frame is i, calculating the number of the next key frame according to a fast forward or fast backward step P, that is, in fast forward, the number of said next key frame=i+[kP], and in fast backward, the number of said next key frame=i−[kP], wherein [ ] represents rounding operation; and according to the number of the next key frame, looking up said frame index file to acquire the number of the block where the key frame number is located;

said decoding and playing unit acquires data starting from said media block number to decode and play.

As for the system of the present invention, wherein, said frame index file in said source node storage unit further records a number and a time stamp of each media key frame;

said block processing unit acquires the number of the media block where the next media frame is located in the following manner: when the user selects a playing mode of fast forward or fast backward, and if a media key frame interval is unfixed and the number of a current frame is i, calculating an ideal time stamp of the next key frame to be played subsequently, that is, in fast forward, said ideal time stamp $T(i+k)=t(i)+k\times a$ fast forward multiple/a fixed quantity of frames played per second; and in fast backward, said ideal time stamp $T(i−k)=t(i)−k\times a$ fast forward multiple/the fixed quantity of frames played per second; and then looking up the frame index file to find the number of a key frame of which the time stamp is closest to said ideal time stamp to take as the number of the next key frame to be played subsequently, and according to the number of said next key frame, looking up said frame index file to acquire the number of the block where the key frame number is located;

said decoding and playing unit acquires data staring from said media block number to decode and play.

As for the system of the present invention, wherein, said frame index file in said source node storage unit further records a number and a time stamp of each media key frame;

said block processing unit acquires the number of the media block where the next media frame is located in the following manner: when the user selects to drag and play, based on comparison between a time corresponding to a dragging point and time stamps of index entries in said frame index file, said block number processing module acquires a media block number corresponding to a frame of which the time stamp is closest to said corresponding time;

said decoding and playing unit acquires data starting from said media block number to decode and play.

The method and system for implementing a cross frame playing mode in P2P media-on-demand proposed by the present invention enrich and improve the functions for client users in P2P media-on-demand to operate the cross frame playing mode of media programs. In addition, the method and system provided by the present invention adapt to the characteristics of P2P multi-source distributed transmission very well; and since the method and system can adapt to multiple media encoding formats as well as fixed or unfixed key frame intervals, the application range is very wide.

PREFERRED EMBODIMENT OF THE PRESENT INVENTION

In a method and system for implementing a cross frame playing mode in P2P media-on-demand provided by the present invention, a media file is partitioned into blocks and encapsulated, and meanwhile, the number of the block where each media key frame is located and the time stamp thereof are recorded, so that a frame index file is formed; when the user requests the media program, firstly the entire frame index file is acquired, which is a premise for the user to perform program operations such as fast forward, fast backward, dragging and playing, pause, and so on. During the process of acquiring the media blocks by block to decode and play, if the user need a pause, it is merely needed to pause acquiring the media blocks; if the user needs the playing to be fast forward or fast backward, the next key frame is acquired according to the fast forward ratio interval, that is, the number of a required block where a key frame is located is acquired through calculation according to the frame index file, and the media block is acquired according to the number, and then the key frame is extracted from the block and decoded and played; when the user need to drag and play the program, the number of the closest key frame is determined according to the time stamp of the dragging point, and further the number of the media block is determined, and starting from the block with this number, the media data is acquired, decoded and played, and thereby the dragging and playing operation is completed.

In relation to embodiments and accompanying drawings, the technical scheme of the present invention is described in detail below.

The First Embodiment

Figure 2:
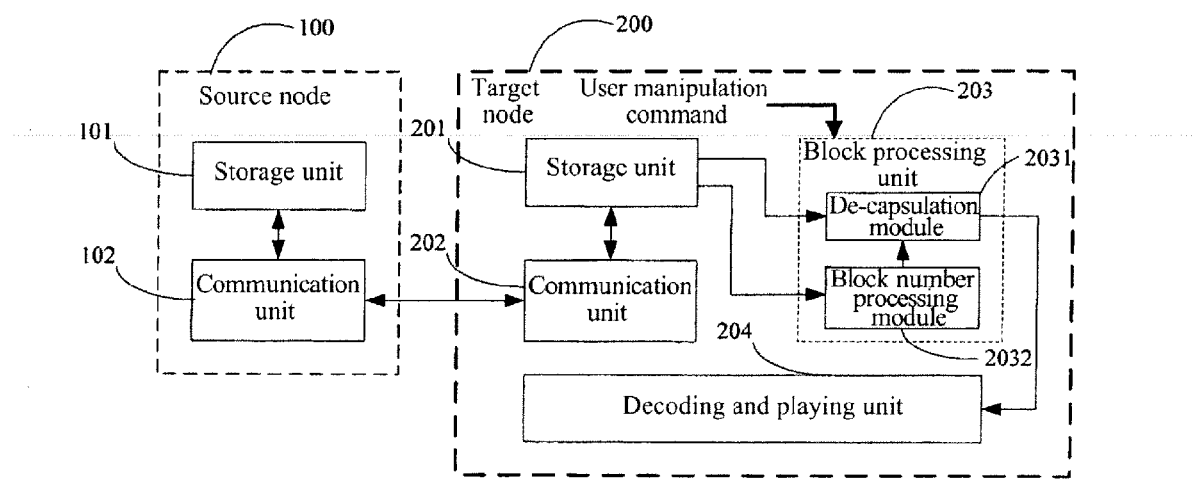
FIG. 2 is a block diagram of the structure of a system for implementing a cross frame playing mode in P2P media-on-demand in accordance with an embodiment of the present invention.

With the method of the present invention, different playing operations of a video program (may comprise audio frames) by a user in media-on-demand in a P2P network can be accomplished. FIG. 2 is a system provided to accomplish cross frame playing operations of a video program by the user in media-on-demand in a P2P network, the system comprises one or more source node devices 100 and target node devices 200 (only one is shown in the drawing). Said source node device 100 is used to partition a requested media file into blocks and encapsulate them into a media content file, and record the number of the block where each media key frame is located to form a frame index file, and then distribute said media content file and said frame index file in the peer to peer network; said target node device 200 is used to acquire said frame index file and the media blocks in said media content file from said source node device 100 when requesting a media; and when cross frame playing is required, it is used to calculate the number of the block where the next key frame is located according to said frame index file, and acquire the corresponding media block to de-capsulate, decode and play. The source node device 100 comprises a storage unit 101, and a communication unit 102; the target node device 200 comprises a storage unit 201, a communication unit 202, a block processing unit 203 and a decoding and playing unit 204; When receiving a command of requesting a video program sent by the target node device 200, the communication unit 102 in the source node extracts the video block file and I frame index file previously partitioned and encapsulated by the P2P network system from the storage unit 101, and sends them to the target node; the communication unit 202 of the target node stores the received streaming media file in the storage unit 201. The block processing unit 203 comprises a de-capsulation module 2031 and a block number processing module 2032. Wherein, the block number processing module 2032 connects with the storage unit 201 to extract the frame index file, and according to a playing mode selected by the user, acquires the number of the block where the next media frame to be played is located from the frame index file, and sends it to the de-capsulation module which acquires the media blocks starting from the block number from a target information storage unit to de-capsulate and send to the decoding and playing unit to decode and play.

Figure 3:
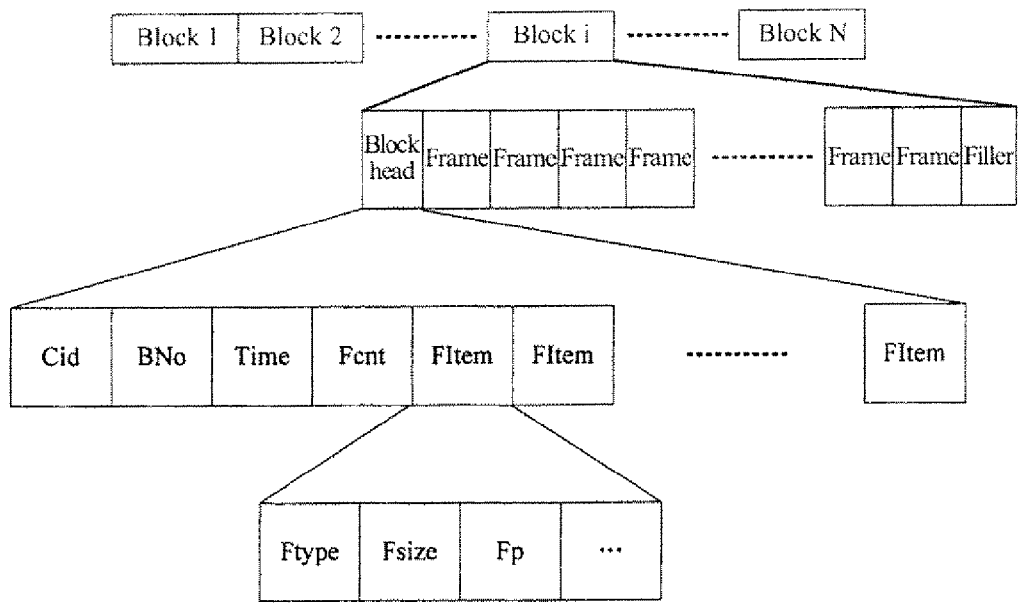
FIG. 3 illustrates an encapsulation format of media blocks in a media content file in accordance with an embodiment of the method and system of the present invention.

In the method for implementing the cross frame playing mode provided by the present invention, firstly pre-processing of partitioning and encapsulation of a media file is performed, and the encapsulation format is shown in FIG. 3. The video frames in the media file are mixed and arranged in time sequence, and these frames are then put into a fixed size block container in sequence, and these blocks form into a media content file. Each media block consists of a block head and a block body, the block body consists of video frames arranged in the sequence of time stamps, and the unfilled part is filled with a filler field; the block head describes the storage condition of the video frames in the block, i.e., the content stored in the media block. A block head comprises the following fields:

Cid (Content identification), the identification of said media content;

Bno (Block Number), the number of the block;

Time, the time stamp, of which the value gives the sampling time of the first byte of the partitioned data;

Fcnt (Frame Count), the quantity of frames located in the block;

Fitem (Frame Item), a frame description item;

Wherein, each frame description item comprises the following fields:

Ftype, the type of the frame, such as video key frame, video common frame, audio frame, and so on;

Fsize, the length of the frame;

FP (Frame Pointer), a frame pointer, representing the initial address of the frame's location in the block.

Figure 4:
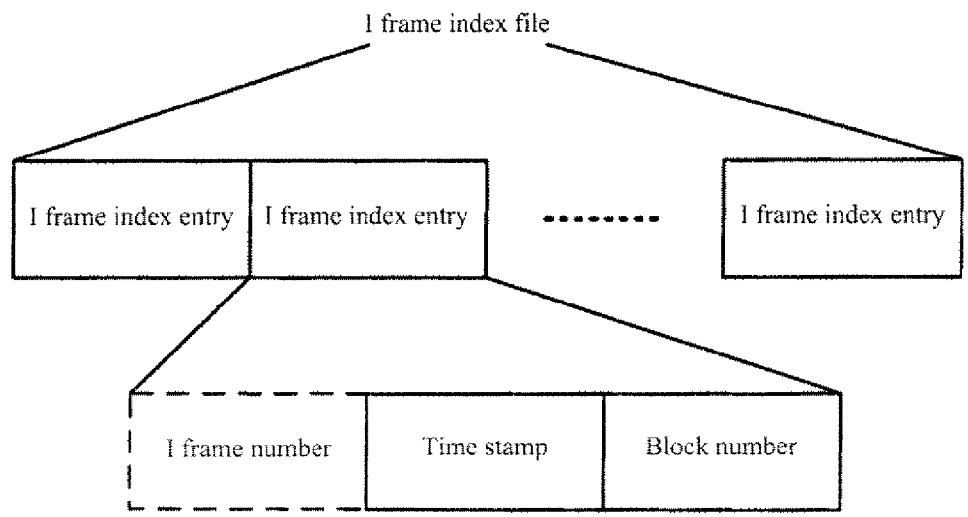
FIG. 4 illustrates a format of a record in an I frame index file in accordance with an embodiment of the method and system of the present invention.

Meanwhile, in the above process, the number of the block where each video key frame is located and the time stamp thereof are recorded, so that an I frame index file is formed. As shown in FIG. 4, the file consists of a series of I frame index entries, and each index entry comprises the following fields:

I frame number, if the numbering is in order, it can be embodied by the position of the index entry in the file (such as the number of the row where it is located), and can be omitted here;

Time stamp, representing the playing time of the I frame;

Block number, i.e., the serial number of the media block.

Figure 1:
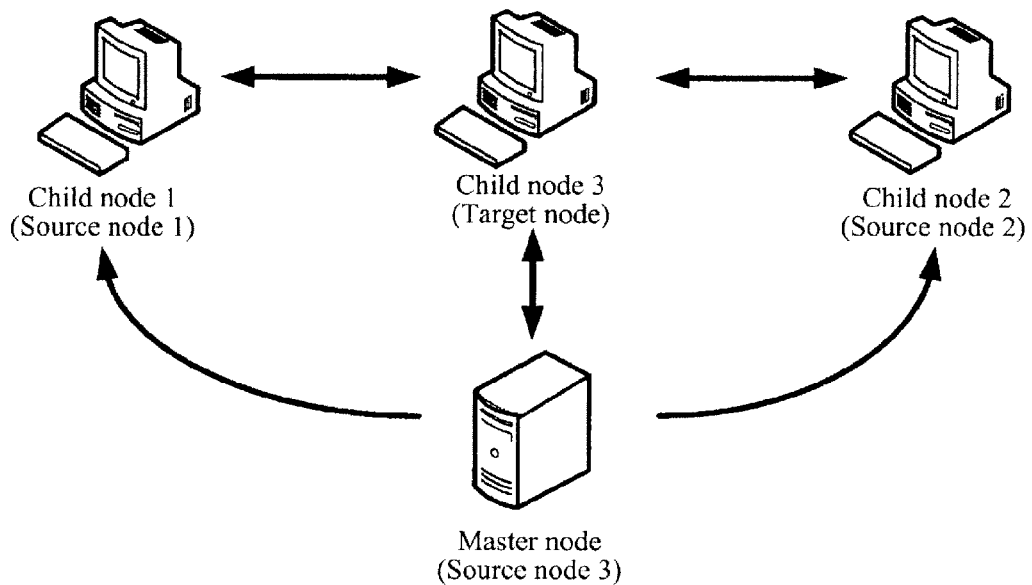
FIG. 1 is a schematic diagram of the structure of a P2P streaming media network system in the prior art.
Figure 5:
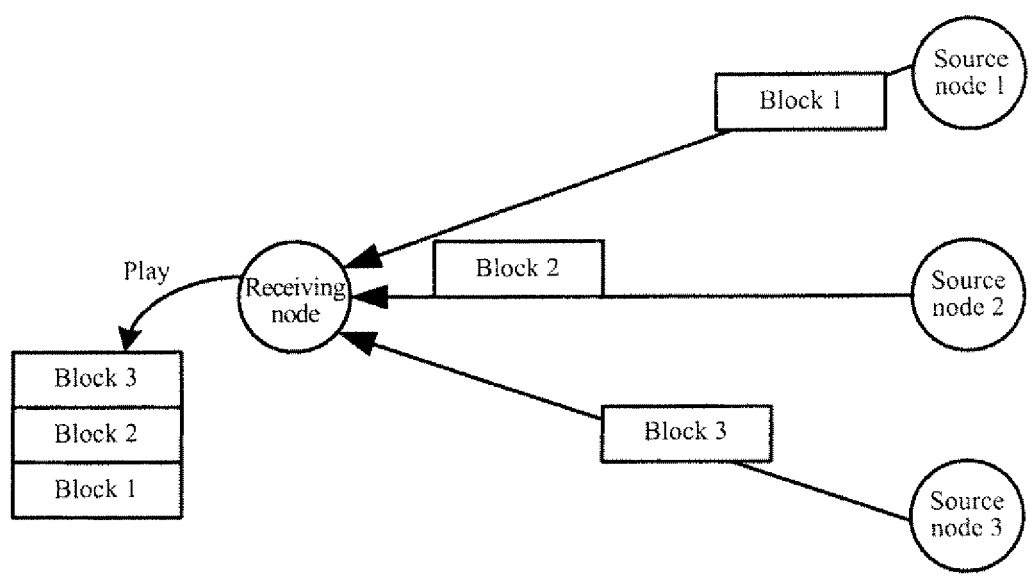
FIG. 5 is a schematic diagram of multi-source transmission by block, splicing, and playing by a P2P streaming media network system in accordance with an embodiment of the present invention.

Then the processed media content file and I frame index file are distributed in the P2P network, and a client (such as child node 3 in FIG. 1) user can acquire media blocks respectively from multiple source nodes (such as the master node and child nodes I and 2 in FIG. 1), as shown in FIG. 5. In FIG. 5, block 2, block 3 and block I are acquired by the client user respectively from source node 2, source node 3 and source node 1, and then through sequence adjustment and splicing of the received media blocks by the client user, the blocks are played in the sequence of block 1, block 2 and block 3. This embodies the convenience of multi-source transmission in the P2P environment.

When a user requests a media, firstly the entire I frame index file is acquired, and media blocks are acquired by block to be decoded and played. When the user needs a pause, it can be accomplished by pausing acquiring media blocks; when the user needs to perform a fast forward or fast backward operation, it is merely needed to calculate the number of the next I frame and according to this, look up the I frame index file to acquire the block number, and acquire the corresponding block to de-capsulate, decode and play. According to whether the I frame interval is fixed, the method for acquiring the number of the next I frame is different:

If the I frame interval is fixed, the fast forward or fast backward can be implemented by playing a fixed quantity of I frames per second; suppose the number of the current I frame is i, and the fast forward or fast backward step (the quantity of frames) is P (P is correlative with the fast forward or fast backward multiple, i.e., p=fast forward multiple (or fast backward multiple)/(I frame interval×the fixed quantity of I frames played per second)), then in fast forward, the number of a subsequent $k^{th}$ I frame to be played is (i+[kP]), and in fast backward, and the number of the subsequent $k^{th}$ I frame to be played is (i−[kP]), wherein [ ] represents rounding operation.

If the I frame interval is unfixed, the quantity of I frames played per second is still fixed in fast forward or fast backward, here, it is needed to determine the number of a subsequent I frame to be played according to the time stamp in the index entry of the I frame index file; suppose the number of the current I frame is i, and the time stamp is t(i), then the ideal time stamp of a subsequent $k^{th}$ I frame to be played is t(i)+k×fast forward multiple/the fixed quantity of I frames played per second, the ideal time stamp value is noted as T(i+k), and look up the I frame index to find an I frame of which the time stamp is closest to T(i+k) to take as the subsequent $k^{th}$ I frame to be played; in fast backward, the ideal time stamp value of a subsequent $k^{th}$ I frame to be played T(i−k)=t(i)−k×fast backward multiple/the fixed quantity of I frames played per second, and also by looking up the I frame index file, an I frame of which the time stamp is closest to T(i−k) is acquired and taken as the subsequent $k^{th}$ I frame to be played.

In dragging and playing, based on comparison between the time corresponding to the dragging point and time stamps of I frame index entries, the block number corresponding to an I frame of which the time stamp is closest to said corresponding time is acquired, and starting from the block number, media blocks are sequentially acquired, de-capsulated, decoded and played, and thereby the dragging an playing operation can be implemented.

The flow of the method for implementing a cross frame playing mode in media-on-demand in a P2P network comprises the following steps:

Step 1, a user requests content of a media, i.e., a client (may also be referred to as a target node) submits to the system a request for playing a video program;

Step 2, a source node which can provide the service of this program in the system sends the content of the program to the client, including the I frame index file and the media blocks comprised in the program content;

Step 3, the client acquires the I frame index file, adjusts the order of the received media blocks and splice them together;

Step 4, according to different operations, the playing processing is as follows:

A. If it is a normal playing, each media block is acquired in sequence, and decoded and played.

B. When the user needs a pause, it can be implemented by pausing acquiring the media blocks.

C. If it is a fast forward or fast backward, it is merely needed to calculate the number of the next I frame and according to this, look up the I frame index file to acquire the block number, and acquire the corresponding block to de-capsulate, decode and play. This divides into the following two situations:

The first situation: if the I frame interval is fixed, the fast forward or fast backward can be implemented by playing a fixed quantity of I frames per second; suppose the number of the current I frame is i, and the fast forward or fast backward step (the quantity of frames) is P (P is correlative with the fast forward or fast backward multiple, i.e., p=fast forward multiple (or fast backward multiple)/(I frame interval×the fixed quantity of I frames played per second)), then in fast forward, the number of a subsequent $k^{th}$ I frame to be played is (i+[kP]), and in fast backward, and the number of a subsequent $k^{th}$ I frame to be played is (i−[kP]), wherein [ ] represents rounding operation;

The second situation: if the I frame interval is unfixed, the quantity of I frames played per second is still fixed in fast forward or fast backward, here, it is needed to determine the number of a subsequent I frame to be played according to the time stamp in the index entry of the I frame index file; suppose the number of the current I frame is i, and the time stamp is t(i), then the ideal time stamp of a subsequent $k^{th}$ I frame to be played is T(i+k)=t(i)+k×fast forward multiple/the fixed quantity of I frames played per second, and look up the I frame index to find an I frame of which the time stamp is closest to T(i+k) to take as the subsequent $k^{th}$ I frame to be played; in fast backward, the ideal time stamp value of a subsequent $k^{th}$ I frame to be played T(i−k)=t(i)−k×fast backward multiple/the fixed quantity of I frames played per second, and also by looking up the I frame index file, an I frame of which the time stamp is closest to T(i−k) is acquired and taken as the subsequent $k^{th}$ I frame to be played.

D. If it is dragging and playing, based on comparison between the time corresponding to the dragging point and time stamps of I frame index entries, the block number corresponding to an I frame of which the time stamp is closest to said corresponding time is acquired, and starting from the block number, media blocks are sequentially acquired, de-capsulated, decoded and played.

The Second Embodiment

The method of the present invention is used to accomplish a cross frame display operation of a video program by the user in media-on-demand in a P2P network. For example, read-only page (frame) images of an electronic book are made from texts and/or static images, and a display system displays the text media in the form of turning pages, and the system supports operations, such as turning pages fast forward, turning pages fast backward, pause turning pages, and dragging and turning pages, performed by the user.

Similarly, first the pre-processing of partitioning and encapsulation of a media file is performed, and the encapsulation format structure is identical to that in the first embodiment, as shown in FIG. 3. Wherein, the frame description item Fitem in the block head comprises the following fields:

Ftype, the type of the frame, such as image frame, audio frame, and so on;

Fsize, the length of the frame;

FP (Frame Pointer), a frame pointer, representing the initial address of the frame's location in the block.

A frame index file is formed during the partitioning and encapsulation process, and the structure of the frame index file is also as that shown in FIG. 4, except that the I frame therein should be replace by frame (page).

When the user requests content of an electronic book, firstly the frame index should be acquired. If it is a normal display mode, each media block is acquired in sequence, and the pages (frames) therein are decoded and displayed one by one according to turning page commands or certain time points. When the user needs to pause turning pages, it is merely needed to pause acquiring image blocks. When the user needs to turn pages fast forward or fast backward, suppose the page interval is fixed, then the fast forward or fast backward can be implemented by playing a fixed quantity of pages per second, suppose the number of the current page is j, the fast forward or fast backward step (the quantity of frames) is Q (Q is correlative with the fast forward or fast backward multiple, i.e., Q=fast forward multiple (or fast backward multiple)/(page interval×the fixed quantity of pages played per second)), then in fast forward, the number of a subsequent $m^{th}$ page to be played is (j+[mQ]), and in fast backward, the number of a subsequent $m^{th}$ page to be played is (i−[mQ]), wherein [ ] represents rounding operation; and according to this number, look up the frame index file to acquire the block number, and acquire corresponding pages of the corresponding block to de-capsulate, decode and display. In dragging and turning pages, based on comparison between the time corresponding to the dragging point and time stamps of frame index entries, the block number corresponding to a page of which the time stamp is closest to the corresponding time is acquired, and starting from the block, image blocks are sequentially acquired, de-capsulated, decoded and displayed.

In this embodiment, steps in the flow of the method for implementing a cross frame display mode of images in media-on-demand in a P2P network are similar to those in the first embodiment.

The method and system for implementing a cross frame playing mode in media-on-demand in a P2P network proposed by the present invention have the following features:

A media file is firstly partitioned into blocks and encapsulated, and a frame index file is formed, the frame index file is extracted before distribution, and user manipulations similar to VCR operations in media-on-demand can be conveniently implemented fully by the user client based on calculation in relation to the frame index file, and this manner adapts to the characteristics of multi-source distributed transmission in P2P very well; in addition, the method can adapt to multiple media encoding formats as well as fixed or unfixed key frame intervals.

Of course, the present invention may have many other embodiments, and without departing from the spirit and essence of the present invention, those skilled in the art can make all kinds of correlative modifications and variations according to the present invention, but these correlative modifications and variations should all fall into the scope of the attached claims of the present invention.

Industrial Applicability

With the method and system of the present invention, the functions for client users in P2P media-on-demand to operate the cross frame playing mode of media programs are enriched and improved. In addition, the method and system provided by the present invention adapt to the characteristics of P2P multi-source distributed transmission very well; and since the method and system can adapt to multiple media encoding formats as well as fixed or unfixed key frame intervals, the application range is very wide.

I claim:

1. A method for implementing a cross frame playing mode in media-on-demand in a peer to peer network, comprising the following steps of:
   a) partitioning a requested media file into media blocks and encapsulating the media blocks into a media content file, and forming a frame index file that records a number of a media block where each media key frame is located;
   b) distributing said media content file and said frame index file in the peer to peer network;
   c) when requesting a media, a client acquiring the media blocks in said media content file and said frame index file from a source node;
   d) when cross frame playing is required, the client calculating a number of a media block where a next media key frame is located according to a number of a next media key frame and said frame index file, and acquiring the corresponding media block to de-encapsulate, decode and play;

wherein each media block consists of a block head and a block body; and a partitioning and encapsulation format of said media content file is;
   said block body consisting of media frames arranged in a sequence of time stamps and an unfilled part being filled with a filler field;
   said block head describing content of media block data in the media block, and said block head comprising the following fields: a media content identification Cid, a block number Bno, a time stamp Time, a quantity of frames in the block Fcnt, and an optional frame description item Fitem.

2. A method of claim 1, wherein, said frame index file further comprises a frame number of each media key frame.

3. A method of claim 2, wherein, if said cross frame playing is playing fast forward or fast backward, and if a media key frame interval is fixed and a number of a current media key frame is i, step (d) further comprises:
   (d1) calculating a fast forward or fast backward step P=a fast forward multiple (or fast backward multiple)/(the media key frame interval×a fixed quantity of media key frames played per second);
   (d2) calculating a number of a next media key frame, that is, in fast forward, calculating the number of a subsequent $k^{th}$ media key frame to be played as (i+[kP]); Or, in fast backward, calculating the number of a subsequent $k^{th}$ media key frame to be played as (i−[kP]), wherein [ ] represents rounding operation;
   (d3) according to the number of said next media key frame, looking up said frame index file to acquire the number of the block where the key frame number is located, and from the block with the number, extracting the frame with the number of said next key frame to decode and play.

4. A method of claim 2, wherein, said frame index file further comprises a time stamp of each media key frame;
   if said cross frame playing is playing fast forward or fast backward, and if a media key frame interval is unfixed and a number of a current frame is i, step (d) comprises:
   (d1) calculating an ideal time stamp of a next media key frame to be played subsequently according to said i; that is, in fast forward, the ideal time stamp of a subsequent $k^{th}$ key frame to be played being T(i+k)=t(i)+k×a fast forward multiple/a fixed quantity of media key frames played per second; and in fast backward, the ideal time stamp of a subsequent $k^{th}$ key frame to be played being T(i−k)=t(i)−k×a fast backward multiple/the fixed quantity of media key frames played per second;
   (d2) looking up the frame index file to find the number of a media key frame of which the time stamp is closest to said ideal time stamp to take as the number of the next media key frame to be played subsequently; that is, in fast forward, finding the number of a media key frame of which the time stamp is closest to T(i+k); or in fast backward, finding the number of a media key frame of which the time stamp is closest to T(i−k);
   (d3) according to the number of said next media key frame, looking up said frame index file to acquire the number of the block where the media key frame is located, and from the block with the number, extracting a frame with the number of said next media key frame to decode and play.

5. A method of claim 1, further comprising:
said frame index file further comprising a time stamp of each media key frame;
if said cross frame playing is dragging and playing, in step (d), based on comparison between a time corresponding to a dragging point and time stamps of index entries in said frame index file, acquiring a block number corresponding to a frame of which the time stamp is closest to said corresponding time, and staring from the block number, sequentially acquiring media data to decode and play.

6. A method of claim 1, wherein, said media content file is a video file and said media key frame is an I frame.

7. A system for implementing a cross frame displaying mode in media-on-demand in a peer to peer network, comprising a source node device and a target node device, wherein,
said source node device that partitions a requested media file into media blocks and encapsulates the media blocks into a media content file and forms a frame index file recording a number of a media block where each media key frame is located, and then distributes said media content file and said frame index file in the peer to peer network;
said target node device that acquires said media blocks in said media content file and said frame index file from said source node device when requesting a media; and when cross frame playing is required, said target node device calculates the number of a media block where a next key frame is located according to a number of a next media key frame and said frame index file, and acquires a corresponding media block to de-capsulate, decode and play;
wherein each media block consist of a block head and a block body; and a partitioning and encapsulation format of said media content file is:
said block body consisting of media frames arranged in a sequence of time stamps and an unfilled part being filled with a filler field;
said block head describing content of media block data in the media block, and said block head comprising the following fields: a media content identification Cid, a block number Bno, a time stamp Time, a quantity of frames in the block Fcnt, and an optional frame description item Fitem.

8. A system of claim 7, wherein said source node device comprises a source node storage unit and a source node communication unit; said target node device comprises a target node storage unit, a target node communication unit, a block processing unit and a decoding and playing unit, wherein,
a streaming media file stored in said source node storage unit comprises a media block file and a frame index file;
said source node communication unit that sends said streaming media file stored in said source node storage unit to said target node when receiving a command of requesting a media sent by said target node;
said target node communication unit stores said streaming media file received in said target node storage unit;
said block processing unit that extracts said frame index file from said target node storage unit when user performs a cross frame operation of the media content file, acquires the number of a media block where a next media frame is located from the frame index file, de-capsulates the media blocks starting from the media block number in said target node storage unit and sends to said decoding and playing unit;
said decoding and playing unit decodes and plays the de-capsulated data.

9. A system of claim 8, wherein,
said frame index file in said source node storage unit further records a number of each media key frame;
said block processing unit acquires the number of the media block where the next media key frame is located in the following manner: when the user selects a playing mode of fast forward or fast backward, and if a media key frame interval is fixed and a number of a current media key frame is i, calculating the number of the next media key frame according to a fast forward or fast backward step P, that is, in fast forward, the number of said next key frame=i+[kP], and in fast backward, the number of said next media key frame=i−[kP], wherein [ ] represents rounding operation; and according to the number of the next key frame, looking up said frame index file to acquire the number of the block where the key frame number is located;
said decoding and playing unit acquires data starting from said media block number to decode and play.

10. A system of claim 8, wherein, said frame index file in said source node storage unit further records a number and a time stamp of each media key frame;
said block processing unit acquires a number of the media block where the next media frame is located in the following manner: when the user selects a playing mode of fast forward or fast backward, and if a media key frame interval is unfixed and a number of a current frame is i, calculating an ideal time stamp of the next media key frame to be played subsequently, that is, in fast forward, said ideal time stamp T(i+k)=t(i)+k×a fast forward multiple/a fixed quantity of media key frames played per second; and in fast backward, said ideal time stamp T(i−k)=t(i)−k×a fast backward multiple/the fixed quantity of media key frames played per second; and then looking up the frame index file to find the number of a media key frame of which the time stamp is closest to said ideal time stamp to take as the number of the next media key frame to be played subsequently, and according to the number of said next media key frame, looking up said frame index file to acquire the number of the block where the key frame number is located;
said decoding and playing unit acquires data staring from said media block number to decode and play.

11. A system of claim 8, wherein,
said frame index file in said source node storage unit further records a number and a time stamp of each media key frame;
said block processing unit acquires the number of the media block where the next media frame is located in the following manner: when the user selects to drag and play, based on comparison between a time corresponding to a dragging point and time stamps of index entries in said frame index file, said block number processing module acquires a media block number corresponding to a frame of which the time stamp is closest to said corresponding time;
said decoding and playing unit acquires data starting from said media block number to decode and play.

* * * * *